United States Patent
Bandaru et al.

(10) Patent No.: US 11,100,424 B2
(45) Date of Patent: Aug. 24, 2021

(54) CONTROL SYSTEM FOR LEARNING AND SURFACING FEATURE CORRELATIONS

(71) Applicant: Microsoft Technology Licensing, LLC, Redmond, WA (US)

(72) Inventors: Ravikumar Venkata Seetharama Bandaru, Harrow (GB); Michael Karl-Frans Berg, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1022 days.

(21) Appl. No.: 15/684,319

(22) Filed: Aug. 23, 2017

(65) Prior Publication Data

US 2019/0065983 A1     Feb. 28, 2019

(51) Int. Cl.
*G06N 20/00* (2019.01)
*G06N 5/02* (2006.01)

(52) U.S. Cl.
CPC ............. *G06N 20/00* (2019.01); *G06N 5/025* (2013.01)

(58) Field of Classification Search
CPC ............................... G06N 20/00; G06N 5/025
See application file for complete search history.

(56) References Cited

U.S. PATENT DOCUMENTS

| | | |
|---|---|---|
| 8,520,818 B2 | 8/2013 | McQuilkin et al. |
| 8,666,844 B2 | 3/2014 | Shaya et al. |
| 9,189,224 B2 | 11/2015 | Ravi |
| 9,262,180 B2 | 2/2016 | Menon et al. |
| 9,466,065 B2 | 10/2016 | Hatakeda et al. |
| 10,313,261 B1 * | 6/2019 | Walton, III ........... G06F 9/5066 |
| 2002/0065721 A1 | 5/2002 | Lema et al. |
| 2007/0171243 A1 * | 7/2007 | Luo ......... G11C 19/00 345/699 |
| 2008/0250323 A1 | 10/2008 | Huff |
| 2013/0166357 A1 | 6/2013 | Eggs et al. |
| 2014/0229407 A1 * | 8/2014 | White ..................... G06Q 10/10 706/12 |
| 2016/0132601 A1 | 5/2016 | Nice et al. |
| 2017/0169345 A1 * | 6/2017 | de Knijf ................ G06N 20/00 |
| 2017/0293919 A1 * | 10/2017 | Li ........................ G06N 20/00 |
| 2017/0318083 A1 * | 11/2017 | Ignatyev ............. H04L 67/1023 |

* cited by examiner

*Primary Examiner* — Kamran Afshar
*Assistant Examiner* — Ryan C Vaughn
(74) *Attorney, Agent, or Firm* — Christopher J. Volkmann; Kelly, Holt & Christenson, PLLC

(57) ABSTRACT

A plurality of different hosted services each includes enabling logic that enables a set of actions. Usage data for a plurality of different tenants are accessed and actions are grouped into features based upon underlying enabling logic. A correlation score between features is identified based on tenant usage data for those features. A tenant under analysis is selected and usage data for the tenant under analysis is used to identify related features that the tenant under analysis is not using, based upon the correlation scores for the features. An output system is controlled to surface the related features for the tenant under analysis.

20 Claims, 18 Drawing Sheets

| TENANT ID | FEATURE A | FEATURE B | FEATURE C | FEATURE D | FEATURE E |
|---|---|---|---|---|---|
| 0 | 0 | 1 | 0 | 0 | |
| 1 | 0 | 1 | 0 | 1 | |
| 1 | 0 | 1 | 1 | 0 | |
| 0 | 1 | 1 | 0 | 1 | |
| 0 | 0 | 0 | 0 | 0 | |
| 1 | 1 | 0 | 1 | 0 | |
| 0 | 0 | 1 | 1 | 1 | |
| 1 | 1 | 0 | 1 | 1 | |
| 0 | 0 | 1 | 1 | 1 | |

FIG. 4A

| FEATURE | FEATURE A | FEATURE B | FEATURE C | FEATURE D | FEATURE E |
|---|---|---|---|---|---|
| FEATURE A | - | 0 | 1 | 0 | 0 |
| FEATURE B | 0.024 | 0 | 1 | 0 | 1 |
| FEATURE C | 0.29 | 0 | 1 | 1 | 0 |
| FEATURE D | 0.25 | 1 | 1 | 1 | 1 |
| FEATURE E | 0.47 | 0 | 1 | 0 | 0 |

FIG. 4C

| FEATURE | FEATURE A | FEATURE B | FEATURE C | FEATURE D | FEATURE E |
|---|---|---|---|---|---|
| FEATURE A | - | 0.24 | 0.29 | 0.25 | 0.47 |
| FEATURE B | 0.24 | - | 0.24 | 0.19 | 0.34 |
| FEATURE C | 0.29 | 0.24 | - | 0.77 | 0.42 |
| FEATURE D | 0.25 | 0.19 | 0.77 | - | 0.33 |
| FEATURE E | 0.47 | 0.34 | 0.42 | 0.33 | - |

— 334

| FEATURE | Usage |
|---|---|
| FEATURE A | 1 |
| FEATURE B | 0 |
| FEATURE C | 1 |
| FEATURE D | 0 |
| FEATURE E | 0 |

| FEATURE | Raw Score | Score Adjusted for Usage | Ranked Recommendation |
|---|---|---|---|
| FEATURE A | 0.29 | - | 0.29 |
| FEATURE B | 0.48 | 0.48 | 0.24 |
| FEATURE C | 0.29 | - | - |
| FEATURE D | 1.02 | 1.02 | 0.77 |
| FEATURE E | 0.90 | 0.90 | 0.42 |

CONTROL SYSTEM FOR LEARNING AND SURFACING FEATURE CORRELATIONS

BACKGROUND

Computing systems are currently in wide use. Some computing systems are cloud-based systems that host cloud-based services for tenants.

Some computing systems host services that include recommenders. Some of these types of recommenders are used to recommend things to a user. For instance, an on-line shopping system may recommend items for a user to purchase. A social media recommender may recommend friends or other contacts or people that the user may wish to add to his or her social network. An on-line news service may recommend news articles for a user to read.

Hosted services also often have different underlying logic that enables different sets of features. For instance, such hosted services can include electronic mail (e-mail) systems that enable a wide variety of e-mail actions (such as authoring and sending an e-mail message, opening an e-mail message, arranging folders in an e-mail system, deleting an e-mail message, etc.). Similarly, a hosted service may be a calendaring system that may enable a wide variety of different types of calendar actions (such as adding an item to a calendar, viewing items on a particular day in a calendar, etc.). Similarly, meeting systems often enable a wide variety of different types of meeting actions (such as sending a meeting request, scheduling a meeting, opening and/or responding to a meeting request, joining a meeting, etc.). File management systems enable many actions (such as sharing a file, opening a file, saving a file, etc.).

The discussion above is merely provided for general background information and is not intended to be used as an aid in determining the scope of the claimed subject matter.

SUMMARY

A plurality of different hosted services each includes enabling logic that enables a set of actions. Usage data for a plurality of different tenants are accessed and actions are grouped into features based upon underlying enabling logic. A correlation score between features is identified based on tenant usage data for those features. A tenant under analysis is selected and usage data for the tenant under analysis are used to identify related features that the tenant under analysis is not using, based upon the correlation scores for the features. An output system is controlled to surface the related features for the tenant under analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4A shows one example of a binary feature usage matrix.

FIG. 4C shows one example of a feature similarity matrix.

FIG. 7C shows one example of binary feature usage matrix.

FIG. 7D shows one example of a recommended feature matrix.

DETAILED DESCRIPTION

When a tenant first subscribes to a service, or even after a tenant has subscribed to a service for some time, the users of the tenant may not be using various features available to the users. However, many tenants are similarly situated in that they are of roughly the same size, and have similar usage patterns. Also, many tenants use similar hosted services. The present discussion proceeds with respect to mining features that have commonality of usage among various tenants, filtered based on various filter criteria, to train a model indicative of the similarity or commonality of usage of those features. A tenant under analysis can then be selected and control signals are generated to acquire tenant information and apply the model to the tenant under analysis to identify features that the tenant under analysis is not using, but that may improve the computing system of the tenant under analysis, if they were used. An actionable output is surfaced for the tenant. The present discussion also proceeds with respect to generating control signals to apply rules that capture institutional or human knowledge about the tenant under analysis in generating an output indicative of recommended features. Further, the present discussion proceeds with respect to tailoring or filtering the output based upon the intended recipient.

Figure 1:
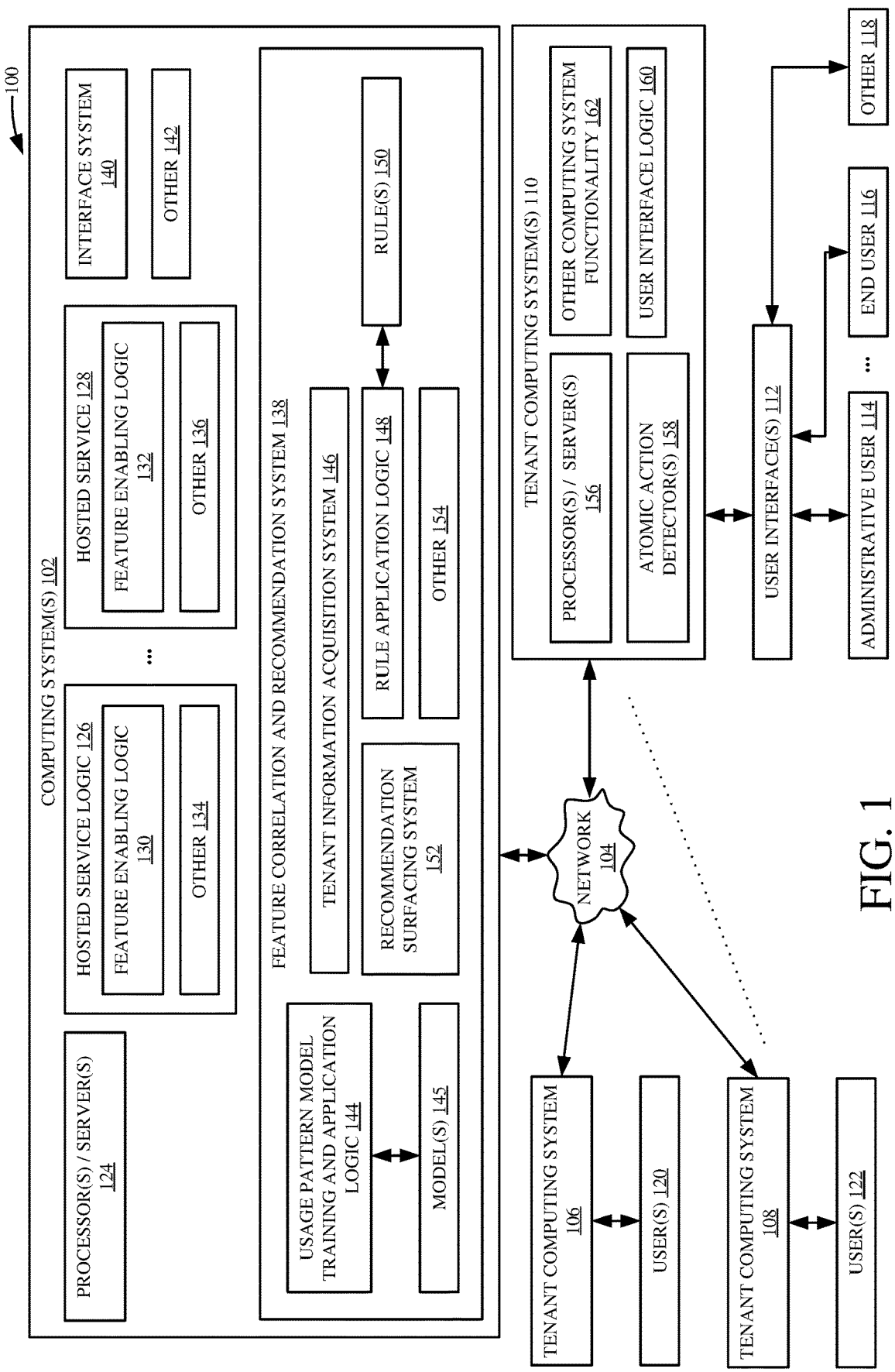
FIG. 1 is a block diagram of one example of a computing system architecture.

FIG. 1 is a block diagram of one example of a computing system architecture 100. Architecture 100 includes one or more computing systems 102 that are communicatively coupled over network 104 to a plurality of different tenant computing systems 106, 108, and 110. Network 104 can be any of a wide variety of networks. For instance, it can be a wide area network, a local area network, a near field communication network, a cellular network, or any of a wide variety of other networks or combinations of networks. A number of the other items illustrated in FIG. 1 are shown, by way of example, in more detail in the block diagrams of FIGS. 2, 3, 5 and 6. Briefly, however, before describing the operation of architecture 100 in more detail, a brief overview of some of the items in architecture 100, and their operation, will first be provided.

In one example, tenant computing system 110 generates one or more user interfaces 112, with user input mechanisms, for interaction by various users. The users can include one or more administrative users 114, one or more end users 116, or one or more other users 118. Users 114-118 illustratively interact with the user input mechanisms on user interfaces 112 in order to control and manipulate tenant computing system 110, and portions of computing system 102. FIG. 1 also shows that, in one example, tenant computing systems 106 and 108 can also generate user interfaces with user input mechanisms for interaction by various users 120 and 122. The users 120 and 122 can include the same group of users as illustrated by blocks 114-118, or different users.

In one example, computing system 102 illustratively includes one or more processors or servers 124, a set of hosted services 126-128, each of which include feature enabling logic 130-132, and each of which can include a wide variety of other items for functionality 134-136. The feature enabling logic 130-132 enables a set of actions to be performed by a tenant computing system that subscribes to the corresponding hosted service 126-128. For instance, where hosted service 126 is an electronic mail (e-mail) service, then feature enabling logic 130 enables a set of e-mail actions, such as authoring an e-mail message, sending an e-mail message, opening or deleting an e-mail message, arranging file folders and filters in an e-mail system, among a wide variety of other actions. Where hosted service 128 is a file management service, then feature enabling logic 132 illustratively enables a set of file management actions to be performed by users of the various tenant computing systems that subscribe to hosted service 128. Such actions can include generating a file, sharing a file, modifying a file, etc. It will be noted that these services are examples only and a wide variety of other services can include a wide variety of other feature enabling logic to enable a different set of actions. Additional examples may include such things as calendar systems, meeting systems, productivity systems (such as word processing systems, slide presentation systems, spreadsheet systems, etc.) among a wide variety of others.

In the example illustrated in FIG. 1, computing system 102 also illustratively includes feature correlation and recommendation system 138, and interface system 140, and it can include a wide variety of other computing system functionalities 142. Feature correlation and recommendation system 138 illustratively includes usage pattern model training and application logic 144 which illustratively trains and applies one or more models 145 that model how various tenants use correlated or similar features, tenant information acquisition system 146, rule application logic 148 that accesses and applies rules 150, and recommendation surfacing system 152, and it can include a wide variety of others 154.

Also, in the example illustrated in FIG. 1, tenant computing system 110 can be similar to tenant computing systems 106-108, or different. For purposes of the present discussion, it will be assumed that they are similar so that only tenant computing system 110 is described in more detail. In the example illustrated, tenant computing system 110 illustratively includes one or more processors or servers 156, one or more atomic action detectors 158, and user interface logic 160, and it can include a wide variety of other computing system functionality 162.

Atomic action detectors 158 on the various tenant computing systems 110 illustratively detect atomic actions (or micro-actions) which are individual actions performed by a user. Such actions may include things such as opening an e-mail message, sending a meeting request, accepting a meeting request, scheduling a task on a calendar, sharing a file in a file management system, etc. Those types of actions are illustratively detected by detectors 158 and communicated through network 104 to computing system 102. In one example, they can be stored on the corresponding tenant computing system and sent intermittently. In another example, they are sent as soon as they are detected. These and other architectures are contemplated herein.

Tenant information acquisition system 146 illustratively acquires tenant information corresponding to each of tenant computing systems 106-110 and also acquires the usage data indicative of the atomic actions performed on each of the tenant computing systems. Usage pattern model training and application logic 144 illustratively aggregates the atomic or micro-actions received from the various tenant computing systems into features. A set of atomic or micro-actions is categorized as a feature based on the feature enabling logic in the hosted services 126-128 that enable the actions. For instance, the feature enabling logic 130 may be logic that enables e-mail actions where hosted service 126 is an e-mail service. Thus, all of the atomic or micro-actions enabled by feature enabling logic 130 (e.g., all of the e-mail actions) will be aggregated into an e-mail feature. The e-mail feature will identify the particular e-mail actions that are taken and that are aggregated into that feature. If hosted service 128 is a document management service, then feature enabling logic 132 may enable document management actions. Therefore, all of the atomic or micro-actions enabled by feature enabling logic 132 are aggregated into the document management feature.

Logic 144 then trains a usage model that identifies the commonality of usage (or similarity) of the different features among the various tenants from which the data were acquired. For instance, it generates a model 145 that assigns scores to the different features indicative of how many of the tenants that use one feature also use other features. This is described in greater detail below, and gives (for example) a correlation between two features based on whether tenants that use a first feature will also use a second feature.

Tenant information acquisition system 146 then acquires tenant information for a tenant to be analyzed. That information includes the atomic or micro-actions detected by the atomic or micro-action detector 158 on the tenant computing system. It can also include demographic information corresponding to the tenant computing system. The atomic or micro-actions are then aggregated to identify which particular features the tenant under analysis is using. Logic 144 then applies model 145 to identify other features that the tenant under analysis is not using, but that will be recommended based upon the commonality of usage scores indicated by model 145. For instance, assume that a large number of tenants who use an e-mail feature also use a calendar feature. If the tenant under analysis does use the e-mail feature, but does not use the calendar feature, then model 145, when applied to the tenant under analysis, will provide an output indicating that the tenant under analysis would very likely benefit from using the calendar feature, because a large percentage of the tenants that use the e-mail feature also use the calendar feature.

Rule application logic 148 accesses rules 150 which capture additional knowledge about the tenant under analysis. For instance, where a tenant representative has information indicating that the tenant under analysis is not technically ready or configured to perform one or more features, then this information may be captured in a rule.

Therefore, when the recommended features are being generated for the tenant under analysis, the rule will apply to indicate that the tenant is not technically ready to perform some of those features, so that those features will be removed from the recommended list of features that will be provided to the tenant under analysis. As is described in greater detail below, rules 150 can include a wide variety of other rules as well, which are applied by rule application logic 148.

Once a set of recommendations are identified for the tenant under analysis, then recommendation surfacing system 152 detects the recipient that will be receiving the set of recommendations and generates a recommendation output for that recipient by filtering the features or otherwise manipulating the recommendations for the identified recipient. It surfaces the recommendations for that recipient on the tenant computing system of the tenant under analysis.

Figure 2:
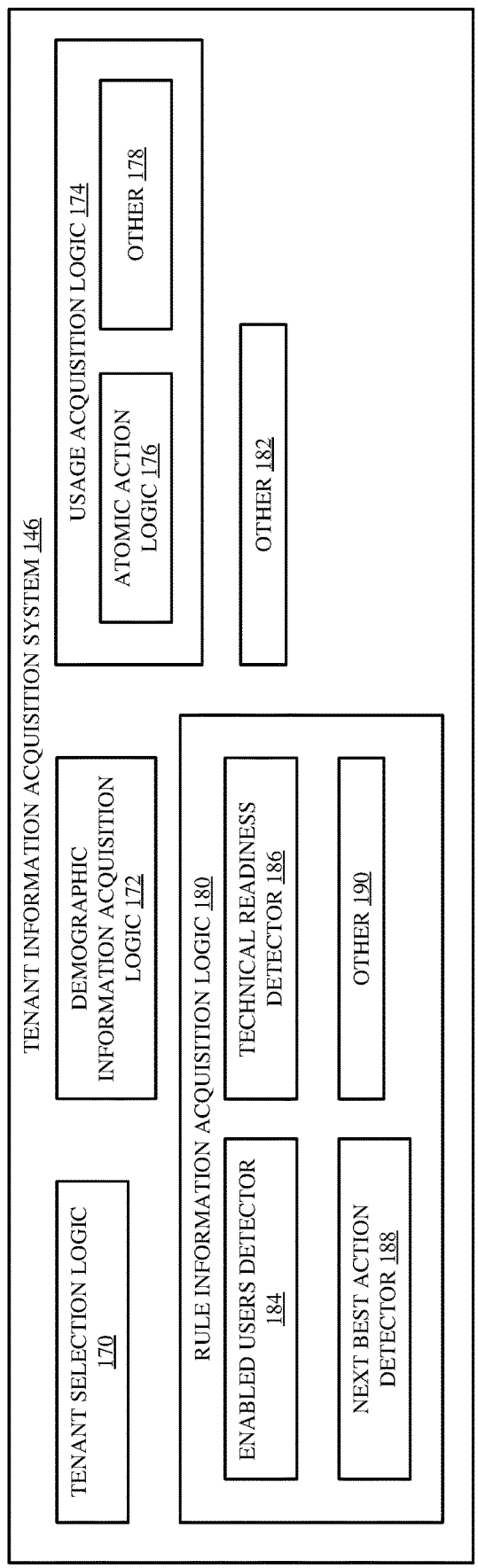
FIG. 2 is a block diagram showing one example of a tenant information acquisition system in more detail.

FIG. 2 is a block diagram showing one example of tenant information acquisition system 146 in more detail. System 146 illustratively includes tenant selection logic 170, demographic information acquisition logic 172, usage acquisition logic 174 (which, itself, includes atomic action logic 176 and can include other items 178), and rule information acquisition logic 180. System 146 can include other items 182. Rule information acquisition logic 180 illustratively includes enabled users detector 184, technical readiness detector 186, and next best action detector 188. Logic 180 can include a wide variety of other items 190.

Tenant selection logic 170 illustratively selects a tenant or group of tenants from which information is to be acquired. Demographic information acquisition logic 172 then acquires demographic information corresponding to the selected tenants. The demographic information can include the size of the tenant (in terms of number of employees, number of licensed seats for one or more different hosted services, etc.), the location of the tenant, and the type of work performed by the tenant. The demographic information can include a wide variety of other items as well.

Usage acquisition logic 174 then acquires usage information corresponding to the tenant. For instance, atomic action logic 176 acquires the atomic or micro-actions that are detected by the atomic or micro-action detectors on the selected tenant. Logic 174 can also illustratively identify a degree of usage for the selected tenant, such as the number of users using a hosted service relative to the number of licenses or enabled users on the tenant, among other things.

Rule information acquisition logic 180 then acquires rule information that indicates which particular rules 150 may be applicable to the selected tenant. Enabled users detector 184 detects the number of enabled users for the selected tenant to determine whether any rules related to a number of enabled users should be applied to the recommendations generated for the selected tenant. Technical readiness detector 186 acquires any technical readiness information indicative of whether any rules related to technical readiness of the tenant should be applied. Next best action detector 188 detects any information corresponding to the selected tenant that indicates that a next best action for the tenant may have already been identified by a representative of a hosted service or by other individuals. The rule information that is acquired by acquisition logic 180 may be manually input information, it may be machine generated information, or it may be a wide variety of other information indicating which particular rules might apply to the selected tenant.

Figure 3:
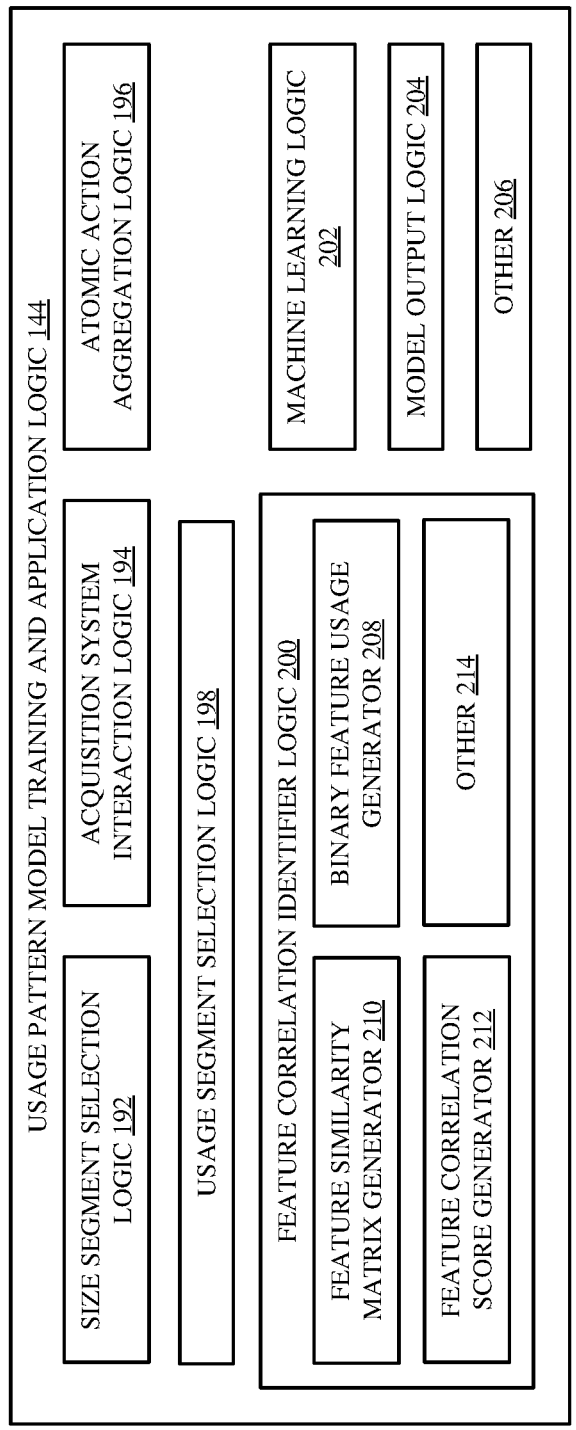
FIG. 3 is a block diagram showing one example of usage pattern model training and application logic in more detail.

FIG. 3 is a block diagram showing one example of usage pattern model training and application logic 144, in more detail. Logic 144 illustratively includes size segment selection logic 192, acquisition system interaction logic 194, atomic action aggregation logic 196, usage segment selection logic 198, feature correlation identifier logic 200, machine learning logic 202, and model output logic 204, and it can include a wide variety of other items 206. Feature correlation identifier logic 200 illustratively includes binary feature usage generator 208, feature similarity matrix generator 210, and feature correlation score generator 212, and it can include a wide variety of other items 214.

Acquisition system interaction logic 194 illustratively interacts with the tenant information acquisition system 146 described above with respect to FIG. 2 to obtain the information that is to be used to either train model 145 or to apply the correct model to a tenant under analysis. In one example, logic 144 illustratively trains a separate model 145 for each different size segment of tenants having different sizes, and/or for each different usage segment for tenants having different levels of usage of the various features that are processed, or for other segments. For instance, large tenants with a first usage level may exhibit similar properties with respect to the commonality of usage of different features. However, large tenants that have a different usage level, or tenants of a different size, may exhibit different properties with respect to the commonality of usage of different features. Therefore, in one example, based upon the information acquired, when logic 144 is training a model, size segment selection logic 192 divides that information into different size segments. Usage segment selection logic 198 divides the information according to usage levels. Then, for each of the different segments (e.g., for each different size segment and/or for each different usage segment), atomic action aggregation logic 196 aggregates the atomic actions for all tenants in a selected segment, based upon the underlying feature enabling logic that enables those actions.

By way of example, aggregation logic 196, for each tenant in a particular segment, aggregates e-mail actions into an e-mail feature. It aggregates file management actions into a file management feature. It aggregates meeting actions into a meeting feature, calendar actions into a calendar feature, etc. Thus, the aggregation identifies, for each tenant in the selected segment, the features that are used by that tenant.

Feature correlation identifier logic 200 then identifies the correlation between features in order to generate the model 145. In one example, it identifies the level of commonality of usage among the various tenants for the different features. Binary feature usage generator 208 illustratively generates a binary usage indicator (e.g., a binary usage matrix) indicating whether each tenant uses a feature. Feature similarity matrix generator 210 generates an indication of similarity of the identified features in terms of whether, if a particular tenant is using a first feature, it is also using a second feature. Feature correlation score generator 212 generates a correlation score corresponding to each feature. Machine learning logic 202 illustratively continues to refine any of the models that are generated by logic 144 and model output logic 204 outputs the model 145 for the selected segment. This process is described in greater detail below with respect to FIG. 4, and it can be repeated for each particular segment (e.g., for each size segment and/or for each usage segment, etc.) identified by logic 192 and logic 198, respectively. Once the model is generated, it can be applied as described below with respect to FIG. 7.

Figure 4:
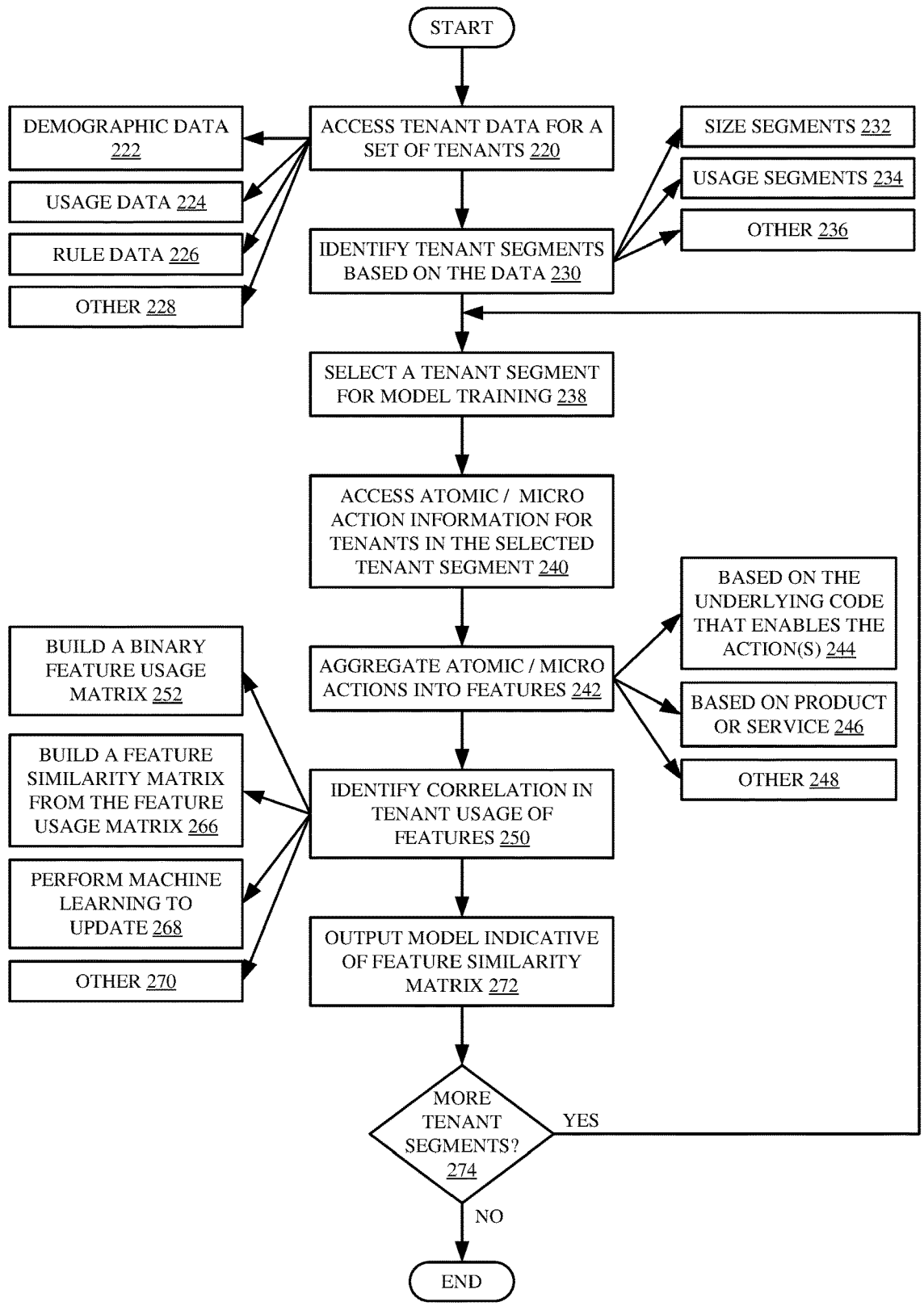
FIG. 4 is a flow diagram illustrating one example of the operation of the usage pattern model training and application logic.

FIG. 4 is a flow diagram illustrating one example of the operation of usage pattern model training and application logic 144 in acquiring information for a set of tenants, and in training a model for each segment. Tenant selection logic 170 first selects the set of tenants from which data are to be acquired in order to generate a model 145. Tenant information acquisition system 146 then accesses tenant data for the set of selected tenants. This is indicated by block 220 in the flow diagram of FIG. 4. For instance, demographic information acquisition logic 172 accesses demographic data 222. Usage acquisition logic 174 accesses usage data (such as atomic or micro-actions) from the set of tenants. This is indicated by block 224. Rule information acquisition logic 180 acquires data that will indicate whether rules 150 apply to the various tenants. This is indicated by block 226. A wide variety of other tenant data can be accessed for the selected set of tenants as well, and this is indicated by block 228.

Based upon the acquired information, the tenant data are divided into different segments, based upon one or more different criteria. Identifying the different tenant segments based on the data is indicated by block 230. By way of example, size segmentation selection logic 192 can identify different size segments based upon the amount of data collected from tenants of different sizes. This is indicated by block 232. Usage segment selection logic 198 illustratively identifies usage segments based on data from different tenants that have different usage levels of the various features enabled by the hosted services. This is indicated by block 234. The tenant data can be divided into a wide variety of other segments as well, and this is indicated by block 236.

Once the data are acquired and has been segmented according to the identified segments, the tenant data for a particular segment (e.g., a tenant segment) is identified so that a model can be trained based on the tenant data for that tenant segment. Selecting a tenant segment for model training is indicated by block 238 in the flow diagram of FIG. 4.

Once the particular segment is selected, the atomic action data for that segment is accessed, and atomic action aggregation logic 196 aggregates the atomic actions, for each tenant in the selected segment, into features. Accessing the atomic or micro-action information for tenants in the selected segment is indicated by block 240. Aggregating those actions into features is indicated by block 242.

In one example, the aggregation is performed based upon the particular feature enabling logic 130-132 that enables the actions. This is indicated by block 244. For instance, all of the actions for a given tenant that are enabled by the same feature enabling logic are illustratively aggregated into a single feature. As an example, if the feature enabling logic is e-mail logic that enables e-mail actions, then all e-mail actions that are enabled by that logic are aggregated into a single e-mail feature. Other examples of this have been discussed above.

In another example, the aggregation is performed along product or service lines. Therefore, if an e-mail system is licensed as a product, then all actions enabled by the e-mail system are aggregated into an e-mail feature. If a file management system is licensed as a product, then all actions enabled by the file management system are aggregated into a feature. Aggregating the atomic or micro-actions into features based upon a product or service is indicated by block 246. The atomic or micro-actions can be aggregated along other lines, and in other ways as well, and this is indicated by block 248. The atomic or micro-actions are illustratively aggregated, for each tenant in the selected segment, so that it is clear which tenants in the selected segment are using which features.

Feature correlation identifier logic 200 then identifies a correlation (or commonality of usage) of features among the tenants in the selected segment. This is indicated by block 250.

One way of doing this is now described, although others can be used. Binary feature usage generator 208 first builds a binary feature usage matrix indicative of the usage of each of the tenants in the selected segment of the various features being considered. The binary feature usage matrix indicates whether a tenant uses a feature or not. Entries in the matrix are indexed by tenant and by feature. Building a binary feature usage matrix is indicated by block 252 in the flow diagram of FIG. 4.

FIG. 4A shows one example of such a matrix. It can be seen that the matrix includes a first column 254 that represents each tenant (by tenant ID) in the selected segment. The matrix also includes a plurality of additional columns 256, 258, 260, 262 and 264. Each of columns 256-264 corresponds to a feature. The entry in the matrix cell for each tenant, and for each feature, identifies whether the tenant uses the feature. In the example shown in FIG. 4A, an entry of 0 means that the tenant does not use the feature while an entry of 1 means that the tenant does use the feature.

Figure 4B:
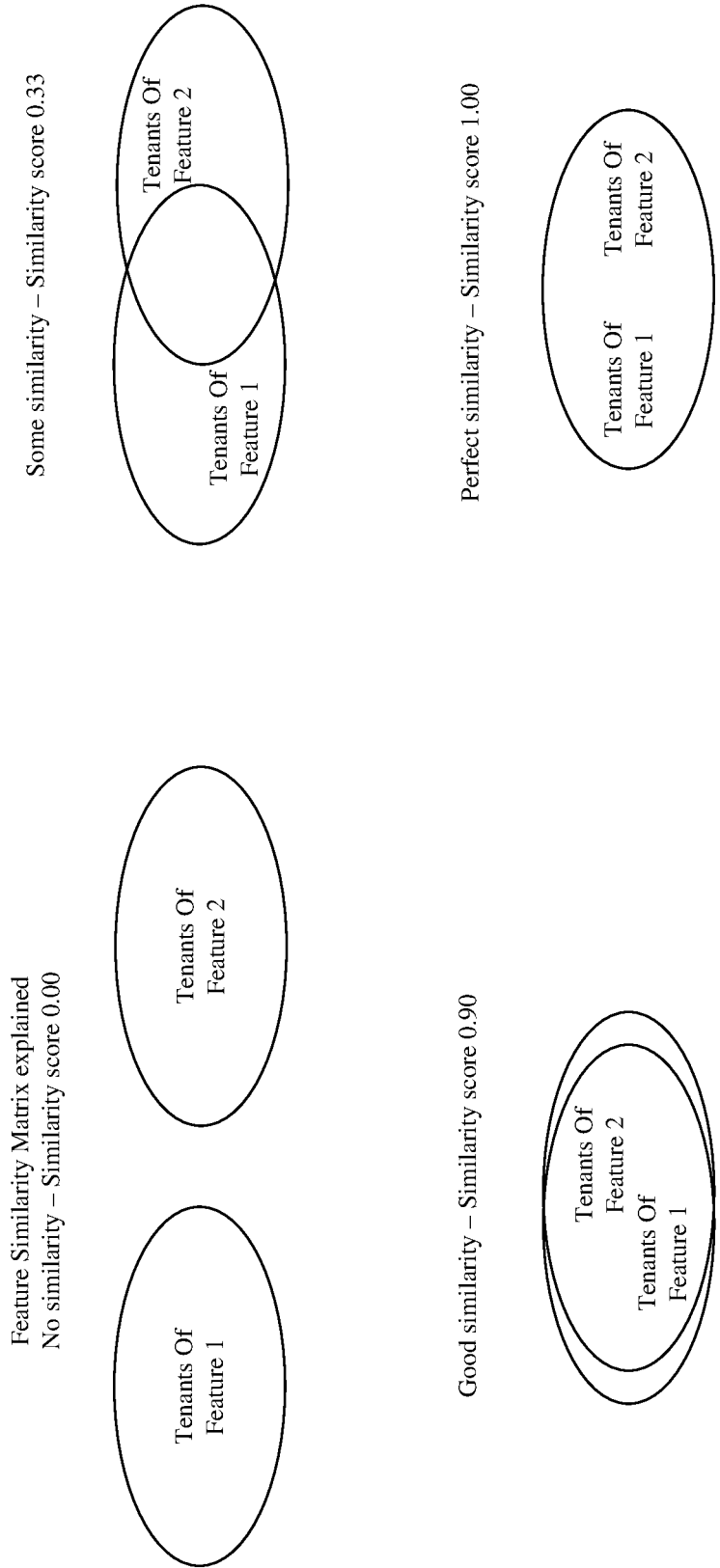
FIG. 4B is a Venn diagram.

Feature similarity matrix generator 210 then generates a feature similarity matrix from the feature usage matrix. This is indicated by block 266 in the flow diagram of FIG. 4. The feature similarity matrix is explained using the Venn diagram shown in FIG. 4B. FIG. 4B shows that, where none of the tenants who use feature 1 is the same as the tenants that use feature 2, the similarity score is 0 for feature 1 relative to feature 2. However, where there is some overlap between the tenants that use feature 1 and those that use feature 2, the similarity score increases as the amount of tenant overlap increases. Finally, where all of the tenants of feature 1 are also tenants who use feature 2, the similarity score is 1.0, and reflects perfect similarity between the two features. FIG. 4C shows one example of a similarity matrix, where each cell in the matrix represents a similarity determined as described above with respect to FIG. 4B.

It will be noted that, in one example, machine learning logic 202 can update the matrices based on additional information that is received from tenants in the selected segment. Performing machine learning to update the matrices is indicated by block 268 in the flow diagram of FIG. 4. Correlation can be identified in other ways as well, and this is indicated by block 270 in the flow diagram of FIG. 4.

The model (e.g., the feature similarity matrix shown in FIG. 4C) has feature scores (or similarity scores) for each combination of features indicating the measure of common usage of those features among the tenants in the selected segment. Model output logic 204 illustratively outputs the model that is indicative of the similarity scores in the feature similarity matrix. Outputting the model is indicated by block 272 in the flow diagram of FIG. 4.

Selection logic 192 and 198 then determine whether there are more segments for which tenants are to be processed. If so, processing reverts to block 238. Determining whether there are more segments to process is indicated by block 274 in the flow diagram of FIG. 4. At the end of processing shown in FIG. 4, a feature similarity model 145 will be trained for each segment (e.g., for each tenant size and/or for each usage level). Thus, when a tenant to be analyzed is selected, the appropriate model can be chosen to identify feature scores for recommended features corresponding to the tenant to be analyzed.

Figure 5:
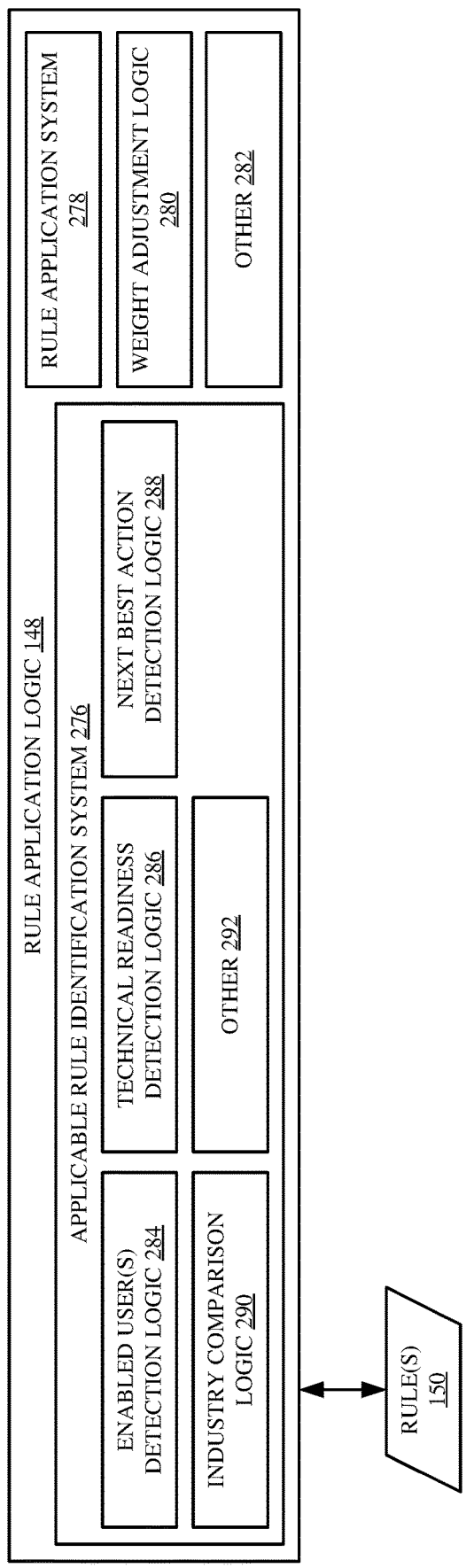
FIG. 5 is a block diagram showing one example of rule application logic in more detail.

Before describing, in greater detail, how the model is applied to a tenant to be analyzed, a brief overview of the rule application logic 148, and recommendation surfacing system 152, will first be provided. FIG. 5 is a block diagram showing one example of rule application logic 148 in more detail. Rule application logic 148 illustratively includes applicable rule identification system 276, rule application system 278, and weight adjustment logic 280, and it can include a wide variety of other items 282. Applicable rule identification system 276 includes enabled users detection logic 284, technical readiness detection logic 286, next best action detection logic 288, and industry comparison logic 290, and it can include a wide variety of different or other items 292.

Enabled users detection logic 284 accesses the tenant information for the tenant under analysis to identify a number of enabled users for the features being analyzed. It then identifies any rules 150 that apply based on the number of enabled users. Technical readiness detection logic 286 identifies tenant information indicating the technical readiness of the tenant to use any of the features to be considered. It then accesses rules 150 to determine whether any of those rules will apply. Next best action detection logic 288 detects any next best action information in the tenant information acquired for the tenant under analysis to determine whether any next best actions have been identified for that tenant. If so, it accesses rules 150 to determine whether any rules apply, in view of the next best action detected. Industry comparison logic 290 illustratively performs a comparison of the features used by the tenant under analysis to a relevant set of tenants in the same industry. It can compare the usage level of the industry wide tenants to those of the tenant under analysis or other items. Based on the comparison, it can access rules 150 to determine whether any industry comparison rules apply to the tenant under analysis.

Rule application logic 278 then applies the various rules, that have been identified by applicable rule identification system 276, to the list of features and feature scores generated by applying the model to the tenant under analysis. The rules may indicate that any of a variety of actions are to be taken. For instance, a rule may indicate that the value of a feature score may be increased or decreased if the rule applies. In that case, weight adjustment logic 280 illustratively modifies the feature score as indicated by the rule. In another example, the rule may indicate that a feature is to be removed from the recommended feature list. By way of example, if a tenant rule applies that indicates that a tenant is not technically capable of using a feature, then that feature would be removed from the recommended feature list for that tenant under analysis. Similarly, if the rule indicates that a next best action has been identified for the tenant under analysis, then the feature corresponding to the next best action may have its score increased by weight adjustment logic 280. These are only examples of how rules may be applied to affect the feature scores corresponding to recommended features for a tenant under analysis.

Figure 6:
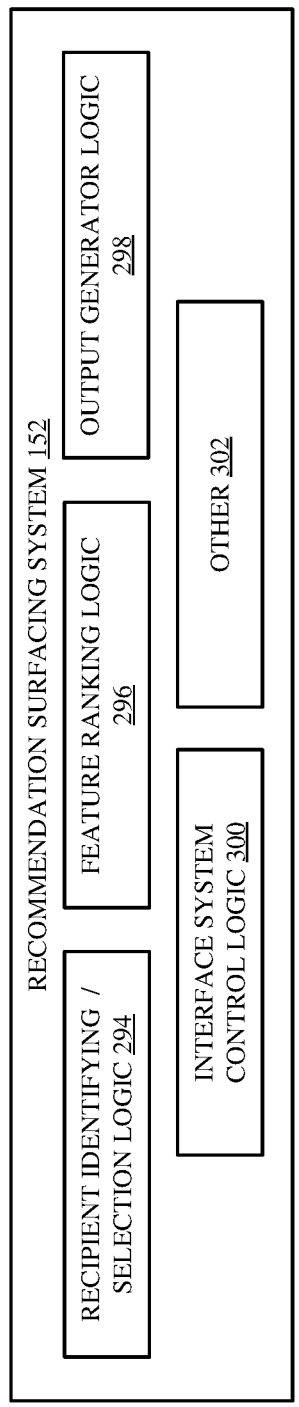
FIG. 6 is a block diagram showing one example of a recommendation surfacing system in more detail.

FIG. 6 is a block diagram showing one example of recommendation surfacing system 152 in more detail. In the example shown in FIG. 6, system 152 illustratively includes recipient identifying/selection logic 294, feature ranking logic 296, output generator logic 298, and interface system control logic 300, and it can include a wide variety of other items 302. Recipient identifying/selection logic 294 illustratively identifies the recipient that the surfaced feature recommendations are to be provided to. The system can then filter the recommended features based upon the recipient. For instance, it may be that features recommended to a user may differ if the recipient of the recommended features is an administrative user 114 (shown in FIG. 1), an end user 116, or another user 118. Feature ranking logic 296 illustratively ranks the recommended features, after the applicable rules have been applied, and after any weight adjustments have been made by weight adjustment logic 280. In one example, it ranks the features in descending order of feature score.

Output generator logic 298 illustratively generates an output indicative of the ranked, recommended features. Interface system control logic 300 illustratively surfaces the output generated by logic 298, for user interaction. This is described in greater detail below with respect to FIG. 7.

Figure 7A:
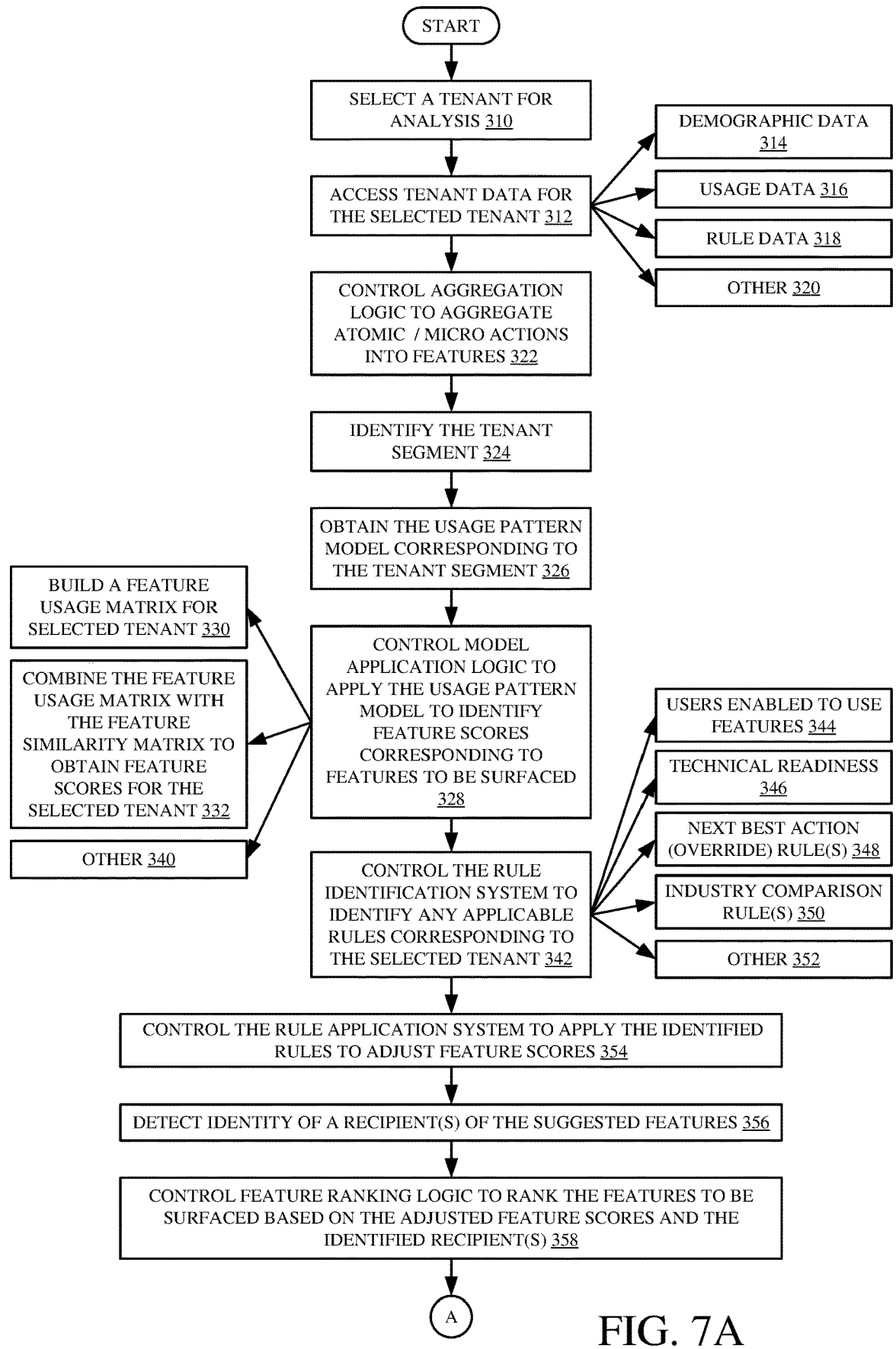
FIGS. 7A and 7B (collectively referred to herein as FIG. 7) show a flow diagram illustrating one example of the operation of a feature correlation and recommendation system.
Figure 7B:
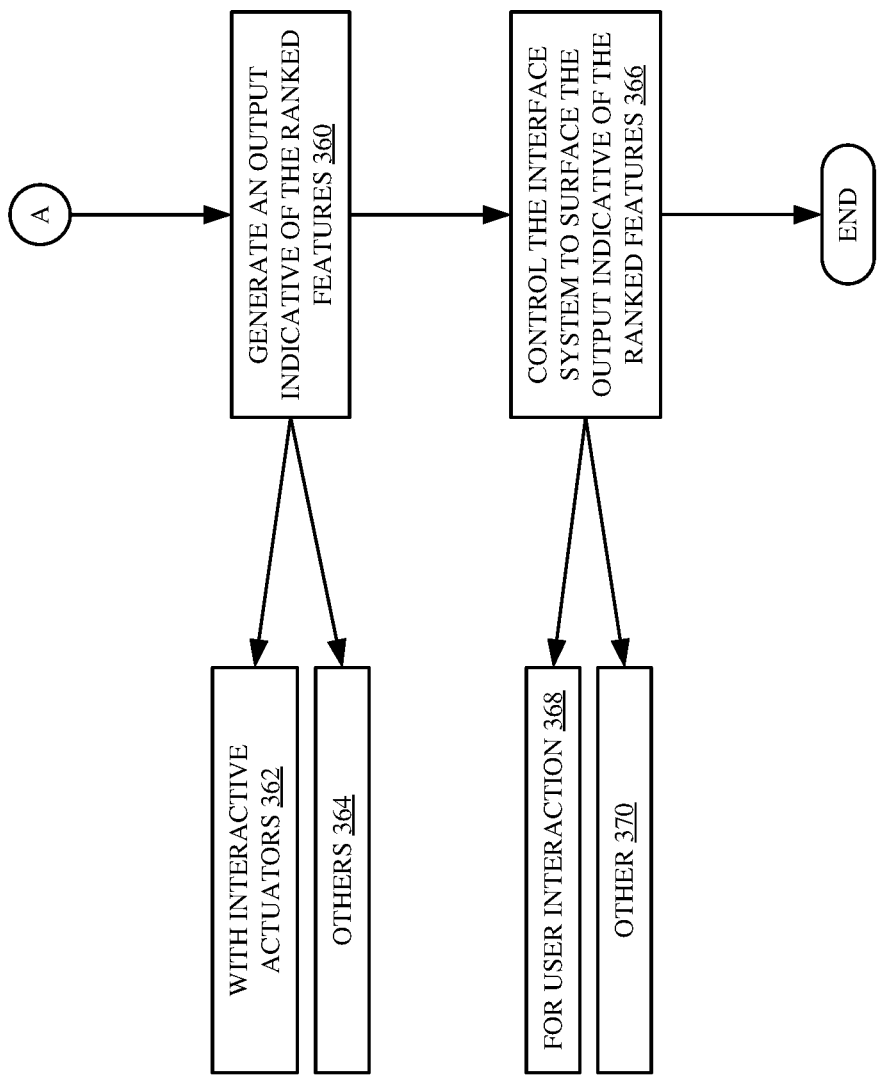

FIGS. 7A and 7B (collectively referred to herein as FIG. 7), illustrate a flow diagram showing one example of the operation of feature correlation and recommendation system 138, in more detail. It is first assumed that one or more models 145 have been trained that correspond to the segment from which a tenant under analysis is selected. Then, tenant selection logic 170 selects a tenant for analysis. This is indicated by block 310 in the flow diagram of FIG. 7. Acquisition system interaction logic 194 then interacts with tenant information acquisition system 146 to obtain access to tenant data for the selected tenant. This is indicated by block 312 in the flow diagram of FIG. 7. In one example, the tenant data for the tenant under analysis may have already been acquired for the tenant under analysis. In another example, the tenant data may be acquired after the tenant is selected.

The tenant data can include demographic data 314 acquired by demographic information acquisition logic 172. They can include usage data 316 acquired by usage acquisition logic 174 and atomic action logic 176. They can include rule data 318 acquired by rule information acquisition logic 180. They can include a wide variety of other tenant data 320 as well. Atomic action aggregation logic 196 is then controlled to aggregate the atomic or micro-actions, detected at the tenant under analysis, into features. This gives an indication as to which features the tenant under analysis is using. Aggregating the atomic or micro-actions into features is indicated by block 322 in the flow diagram of FIG. 7.

Size segment selection logic 192 and/or usage segment selection logic 198 can also identify a particular segment to which the tenant under analysis belongs. It can be a size segment, a usage level segment, or other segments. Identifying the tenant segment is indicated by block 324.

Once the tenant segment, to which the tenant under analysis belongs, is identified then the particular model 145 that was trained for that segment is obtained. This is indicated by block 326. The usage pattern model training and application logic 144 is then controlled to apply the usage pattern model, for the proper segment, to the tenant under analysis in order to identify feature scores corresponding to features to be surfaced, as recommended features, for the tenant under analysis. This is indicated by block 328. This can be done in a wide variety of different ways.

For instance, binary feature usage generator 208 illustratively generates a binary feature usage matrix for the selected tenant. This is indicated by block 330 and provides an indication as to which features the tenant under analysis is using. Feature correlation score generator 212 then combines the feature usage matrix for the tenant under analysis, with the feature similarity matrix in the model, to obtain feature scores for the selected tenant under analysis. This is indicated by block 332. In one example, the binary feature usage matric for the tenant under analysis is multiplied by the feature similarity matrix indicated by the selected model 145.

FIG. 7C shows one example of a feature similarity matrix 334 which is the same as that shown in FIG. 4C. FIG. 7C also shows a binary feature usage matrix 336 that was generated for a tenant under analysis. It indicates whether the tenant under analysis is already using the features represented in the feature similarity matrix 334. Combining those matrices, by multiplying them, gives a recommended feature matrix such as matrix 338 shown in FIG. 7D. By way of example, if the tenant under analysis is already using one of the features, then that feature is removed from the recommended feature list. If the tenant under analysis is not using one of the features, then that feature is maintained in the recommended feature list. Thresholds can be applied to modify the list (e.g., based on the feature scores) as well. The model can be applied in other ways as well, and this is indicated by block 340 in the flow diagram of FIG. 7.

Once the feature scores for all recommended features for the tenant under analysis have been generated, then rule application logic 148 is controlled to identify any applicable rules, and apply those rules to the feature scores. Controlling the rule identification system 276 to identify any applicable rules corresponding to the selected tenant under analysis is indicated by block 342. For instance, it can identify rules based on whether the users are enabled to use the features as indicated by block 344, based upon the technical readiness 346 of the tenant under analysis, based upon a next best action that is identified and may be used to override feature scores, as indicated by block 348, based upon industry comparison rules 350, or in a wide variety of other ways 352. Applying the identified rules to adjust the feature scores is indicated by block 354 in the flow diagram of FIG. 7.

Recipient identifying/selection logic 294 then identifies or selects the identity of a recipient of the suggested features. This is indicated by block 356. As discussed above, the recipient may be an administrative user, an end user, or another user, and it may be that the suggested or recommended features vary based upon the particular recipient who will be receiving the ranked set of recommended features.

Feature ranking logic 296 is then controlled to rank the features to be surfaced based upon the adjusted feature scores and the identified recipient. This is indicated by block 358 in the flow diagram of FIG. 7.

Output generator logic 298 generates an output indicative of the ranked set of features as indicated by block 360 in the flow diagram of FIG. 7. The output can include interactive actuators 362 that allow the user to navigate to a user experience to employ the features in the recommended feature list. The actuators can be actuated by the recipient in order to receive additional information about the features, how they were ranked, the feature scores, or other underlying information or additional information about the features. The output can be generated in other ways as well, and this is indicated by block 364.

Once the output is generated, interface system control logic 300 controls interface system 140 to surface the output indicative of the ranked features. This is indicated by block 366. Again, the interface system can surface those features for user interaction 368, or in other ways 370.

It can thus be seen that the present description applies a wide variety of different filters in performing data mining to surface relevant information. The information is used to control model generator logic to generate a model indicative of tenant usage information. The tenant usage information aggregates atomic or micro-actions into features and generates feature similarity (or common usage scores) for each of the features. When a tenant under analysis is selected, the tenant data are acquired, using similar filters, and a tenant segment is identified. The proper model is identified and applied to the tenant under analysis to identify features that are not used by the tenant under analysis, but that are correlated to the features that the tenant under analysis is using. The scores can be adjusted by applying rules. Tenant data are detected to indicate whether the rules are applicable, and the applicable rules are applied when identifying the set of features. This not only improves operation of the computing system itself, but improves the user experience. By filtering and surfacing information in this way, the computing system overhead and network bandwidth is reduced, because it eliminates multiple roundtrips to various tenant data stores. It also surfaces a recipient-specific actionable output, which enhances the user experience.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
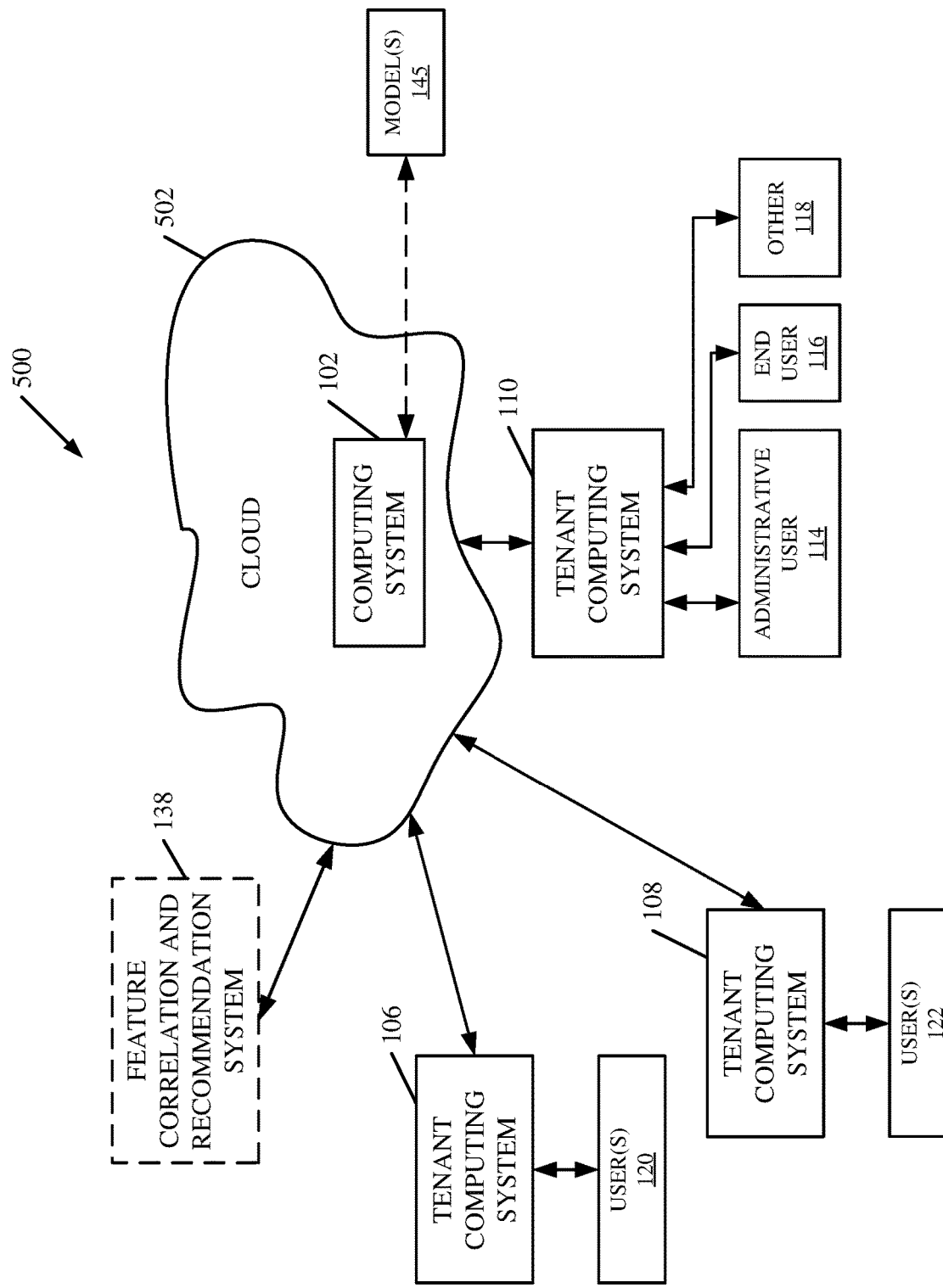
FIG. 8 is a block diagram showing one example of the architecture illustrated in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100, as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that computing system 102 can be located in cloud 502 (which can be public, private, or a combination where portions are public while others are private). Therefore, users 114, 116, 118, 120 and 122 use user devices to access those systems through cloud 502.

FIG. 8 also depicts another example of a cloud architecture. FIG. 8 shows that it is also contemplated that some elements of computing system 102 can be disposed in cloud 502 while others are not. By way of example, feature correlation and recommendation system 138 can be disposed outside of cloud 502, and accessed through cloud 502. In another example, data stores (or other items) can be outside of cloud 502. Regardless of where they are located, they can be accessed directly by a user device through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
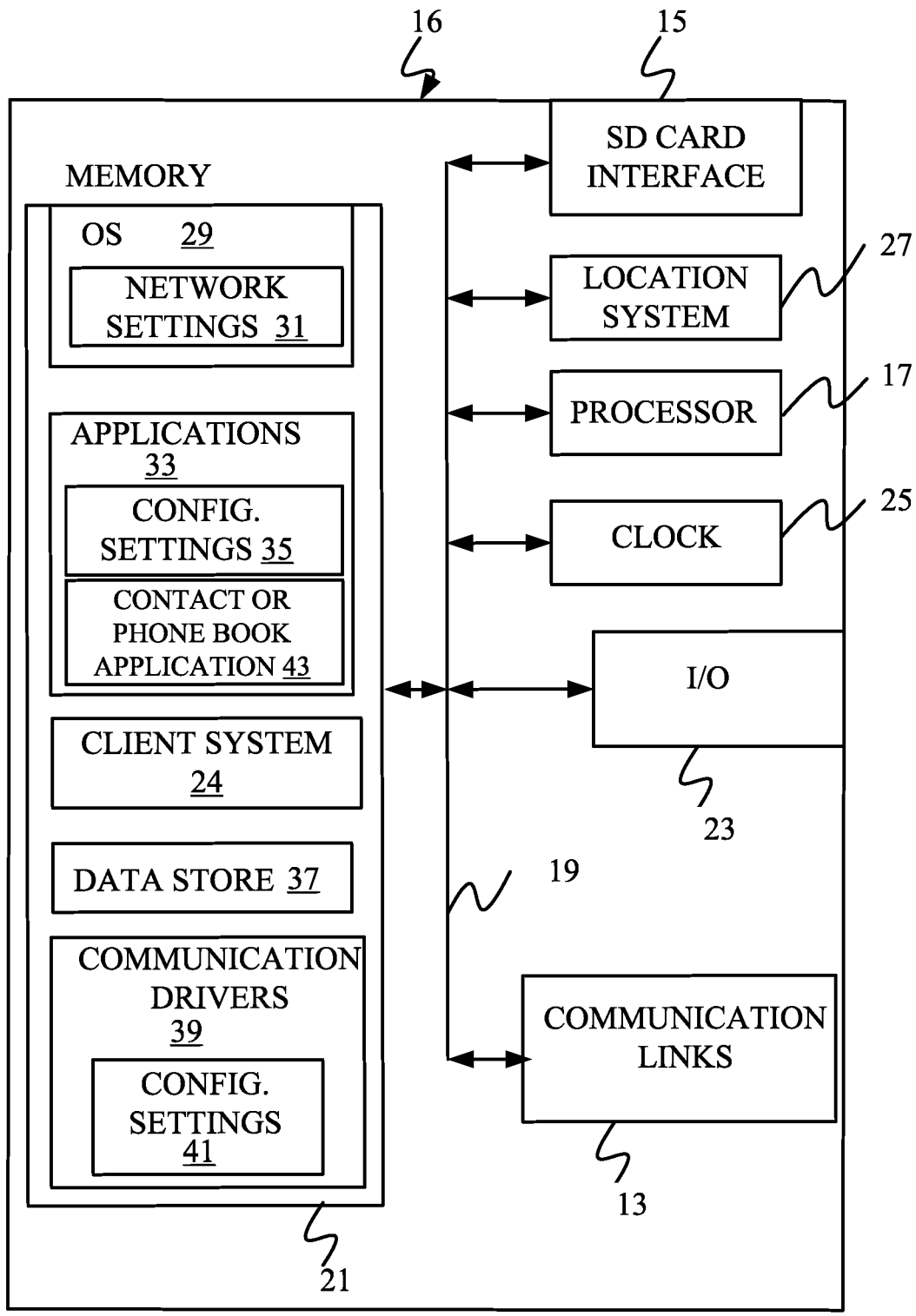
FIGS. 9-11 are examples of mobile devices.
Figure 10:
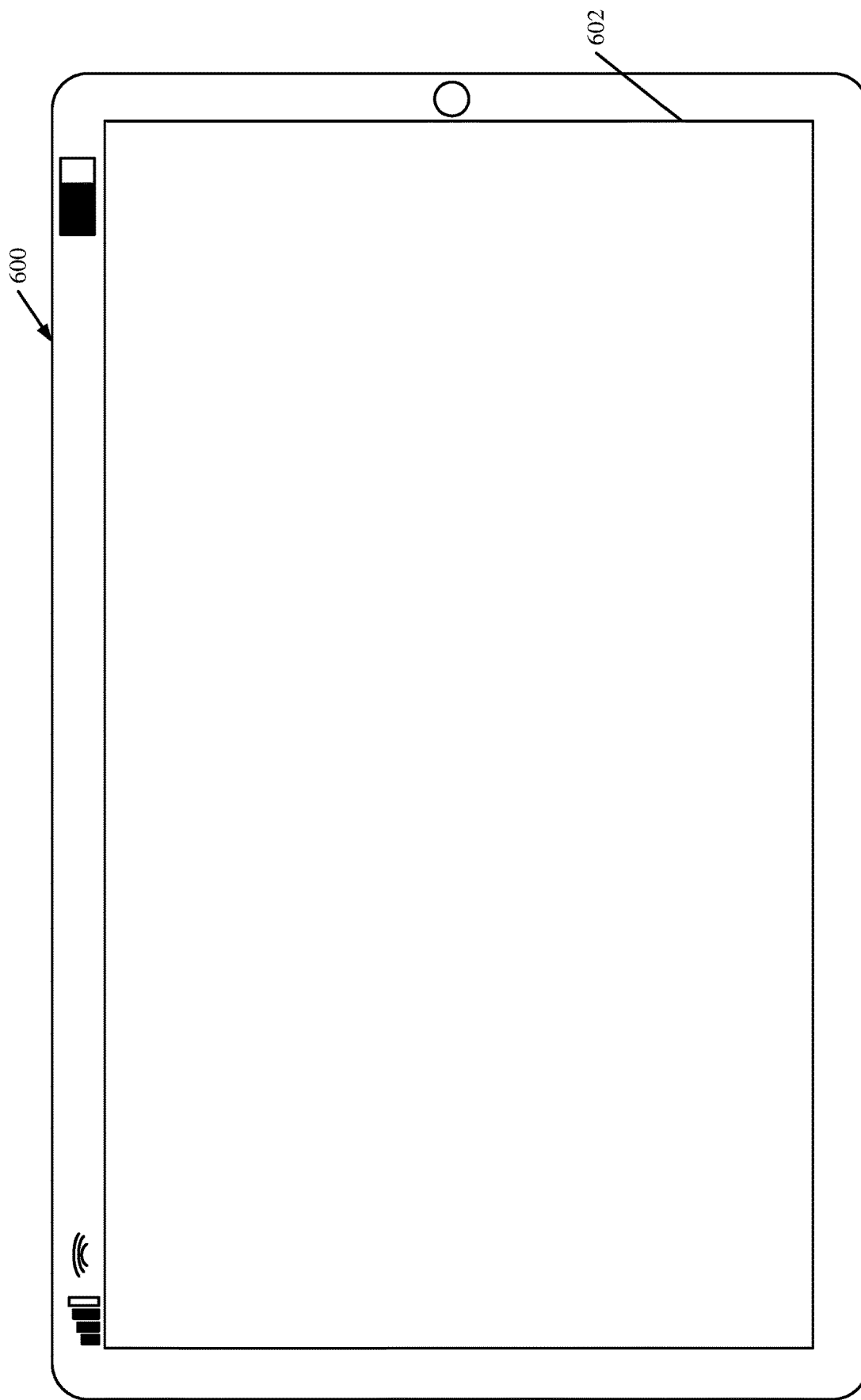
Figure 11:
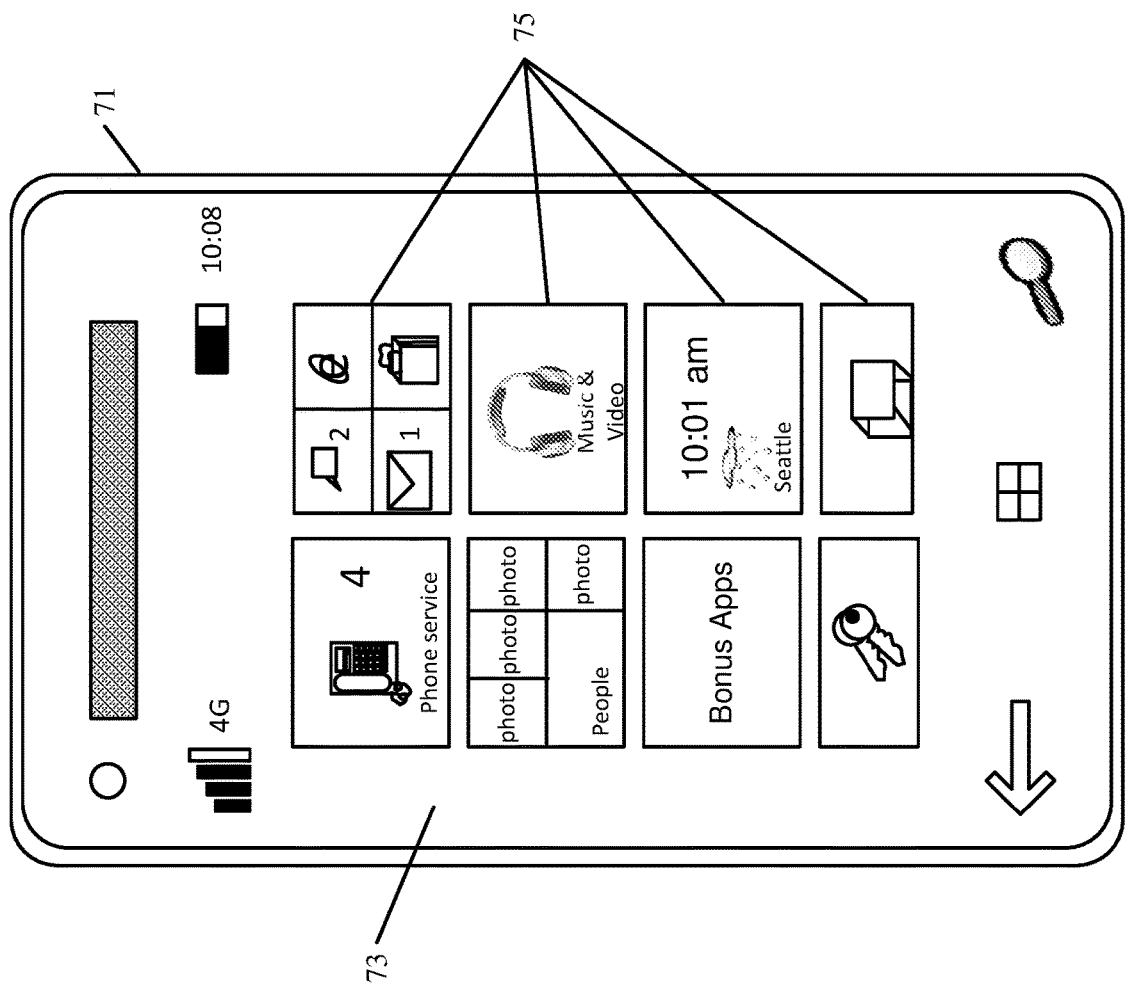

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of computing system 102 or tenant computing systems 106, 108, 110 or user devices or system 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as WI-FI protocols, and BLUETOOTH protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well. In the illustrated example, applications 33 include a contact or phone book application 43.

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
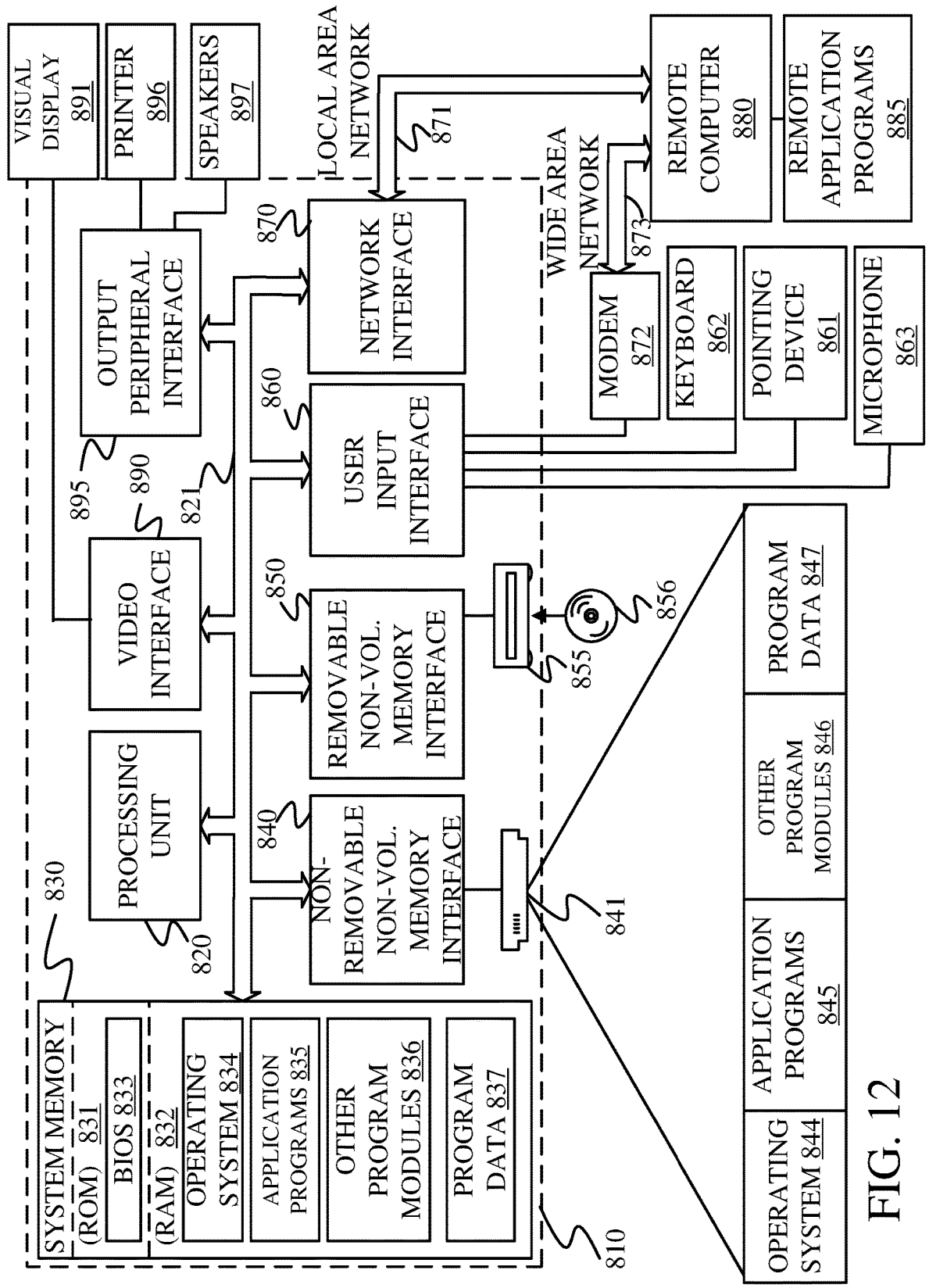
FIG. 12 is a block diagram showing one example of a computing environment that can be used in the architectures shown in the previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. A computer storage medium is different from, and does not include, a modulated data signal or carrier wave. Computer storage media include hardware storage media including both volatile and nonvolatile, removable and non-removable media implemented in any method or technology for storage of information such as computer readable instructions, data structures, program modules or other data. A computer storage medium includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embody computer readable instructions, data structures, program modules or other data in a transport mechanism and can include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

usage acquisition logic that acquires action data from a plurality of different tenant computing systems, the action data from each tenant computing system being indicative of actions taken by users of the tenant computing system in using one or more hosted services;

action aggregation logic that groups the action data, acquired for each tenant computing system, into feature groups based on feature enabling logic in the one or more hosted services that enables the actions indicated by the action data, each feature group representing a feature, each feature group for each particular tenant computing system indicating that the particular tenant computing system uses the feature represented by the feature group;

feature correlation identifier logic that compares the features used by different ones of the plurality of different tenant computing systems and generates a correlation model with a set of correlation scores for each feature, wherein a correlation score is generated for each feature relative to each other feature represented in the feature groups, the correlation score for a first feature relative to a second feature being indicative of an extent to which tenant computing systems that use the second feature also use the first feature;

model application logic configured to apply the correlation model to usage data acquired from a tenant computing system under analysis to identify correlated features that are correlated to a feature used by the tenant computing system under analysis; and interface system control logic configured to generate a control signal to control an interface system based on the correlated features identified by the model application logic.

Example 2 is the computing system of any or all previous examples, further comprising:

rule information acquisition logic configured to detect rule information corresponding to the tenant computing system under analysis, the rule information being indicative of whether an applicable rule is to be applied to adjust the correlated features identified.

Example 3 is the computing system of any or all previous examples, further comprising:

an applicable rule identification system configured to compare the detected rule information with a set of rules to identify the applicable rule.

Example 4 is the computing system of any or all previous examples, further comprising:

rule application logic configured to apply the applicable rule to the correlated features to adjust a portion of the correlated features as indicated by the applicable rule.

Example 5 is the computing system of any or all previous examples, further comprising:

demographic information acquisition logic configured to acquire demographic information from the plurality of different tenant computing systems.

Example 6 is the computing system of any or all previous examples, further comprising:

segment selection logic configured to segment the plurality of different tenant computing systems into a plurality of different segments based on segmentation criteria, the feature correlation identifier logic being configured to generate a correlation model corresponding to each of the plurality of different segments.

Example 7 is the computing system of any or all previous examples, wherein the segment selection logic is configured to identify a segment, of the plurality of different segments, that the tenant computing system under analysis falls into based on the segmentation criteria, and wherein the model application logic is configured to identify a correlation model corresponding to the identified segment.

Example 8 is the computing system of any or all previous examples, wherein the model application logic is configured to apply the identified correlation model to the tenant computing system under analysis.

Example 9 is the computing system of any or all previous examples, wherein the segmentation selection logic comprises:

size segmentation selection logic configured to segment the plurality of different tenant computing systems into size segments based on a number of users of each of the plurality of different tenant computing systems.

Example 10 is the computing system of any or all previous examples, wherein the segmentation selection logic comprises:

usage segmentation selection logic configured to segment the plurality of different tenant computing systems into usage segments based on a usage level of users of each of the plurality of different tenant computing systems.

Example 11 is a computer implemented method, comprising:

acquiring action data from a plurality of different tenant computing systems, the action data from each tenant computing system being indicative of actions taken by users of the tenant computing system in using one or more hosted services;

grouping the action data, acquired for each tenant computing system, into feature groups based on feature enabling logic in the one or more hosted services that enables the actions indicated by the action data, each feature group representing a feature, each feature group for each particular tenant computing system indicating that the particular tenant computing system uses the feature represented by the feature group;

comparing the features used by different ones of the plurality of different tenant computing systems;

generating a correlation model with a set of correlation scores for each feature, wherein a correlation score is generated for each feature relative to each other feature represented in the feature groups, the correlation score for a first feature relative to a second feature being indicative of an extent to which tenant computing systems that use the second feature also use the first feature;

applying the correlation model to usage data acquired from a tenant computing system under analysis to identify correlated features that are correlated to a feature used by the tenant computing system under analysis; and generating a control signal to control an interface system based on the correlated features identified by the model application logic.

Example 12 is the computer implemented method of any or all previous examples, further comprising:

detecting rule information corresponding to the tenant computing system under analysis, the rule information being indicative of whether an applicable rule is to be applied to adjust the correlated features identified.

Example 13 is the computer implemented method of any or all previous examples, further comprising:

comparing the detected rule information with a set of rules to identify the applicable rule.

Example 14 is the computer implemented method of any or all previous examples, further comprising:

applying the applicable rule to the correlated features to adjust a portion of the correlated features as indicated by the applicable rule.

Example 15 is the computer implemented method of any or all previous examples, further comprising:

acquiring demographic information from the plurality of different tenant computing systems.

Example 16 is the computer implemented method of any or all previous examples, further comprising:

segmenting the plurality of different tenant computing systems into a plurality of different segments based on segmentation criteria, wherein generating a correlation model comprises generating a correlation model corresponding to each of the plurality of different segments.

Example 17 is the computer implemented method of any or all previous examples, further comprising:

identifying a segment, of the plurality of different segments, that the tenant computing system under analysis falls into based on the segmentation criteria; and identifying a correlation model corresponding to the identified segment, wherein applying the correlation model comprises applying the identified correlation model to the tenant computing system under analysis.

Example 18 is the computer implemented method of any or all previous examples, wherein segmenting comprises:

segmenting the plurality of different tenant computing systems into size segments based on a number of users of each of the plurality of different tenant computing systems.

Example 19 is the computer implemented method of any or all previous examples, wherein the segmenting comprises:

segmenting the plurality of different tenant computing systems into usage segments based on a usage level of users of each of the plurality of different tenant computing systems.

Example 20 is a computing system, comprising:

usage acquisition logic that acquires action data from a plurality of different tenant computing systems, the action data from each tenant computing system being indicative of actions taken by users of the tenant computing system in using one or more hosted services;

action aggregation logic that groups the action data, acquired for each tenant computing system, into feature groups based on feature enabling logic in the one or more hosted services that enables the actions indicated by the action data, each feature group representing a feature, each feature group for each particular tenant computing system indicating that the particular tenant computing system uses the feature represented by the feature group;

segment selection logic configured to segment the plurality of different tenant computing systems into a plurality of different segments based on segmentation criteria;

feature correlation identifier logic that compares the features used by different ones of the plurality of different tenant computing systems and generates a correlation model, for each segment, with a set of correlation scores for each feature, wherein a correlation score is generated for each feature relative to each other feature represented in the feature groups, the correlation score for a first feature relative to a second feature being indicative of an extent to which tenant computing systems, in a same segment, that use the second feature also use the first feature;

model application logic configured to identify a correlation model for a tenant computing system under analysis based on a segment for the tenant computing system under analysis, and apply the identified correlation model to usage data acquired from the tenant computing system under analysis to identify correlated features that are correlated to a feature used by the tenant computing system under analysis; and interface system control logic configured to generate a control signal to control an interface system based on the correlated features identified by the model application logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor, and
memory storing instructions executable by the at least one processor, wherein the instructions, when executed, cause the computing system to:
acquire action data from a plurality of different tenant computing systems,
each particular tenant computing system, of the plurality of different tenant computing systems, including a plurality of users that use one or more hosted services comprising a set of features, and the action data from each particular tenant computing system indicating actions taken by the plurality of users of the particular tenant computing system in using the set of features of the one or more hosted services;

group the action data, acquired for each tenant computing system, into feature groups, wherein each feature group represents a feature of the set of features, and each feature group, for each particular tenant computing system, indicates that the particular tenant computing, system uses the feature represented by the feature group;

receive feature usage data representing usage of the set of features by different ones of the plurality of different tenant computing systems;

train, based on the feature usage data, a correlation model having a set of correlation scores, wherein each particular correlation score, in the set of correlation scores, indicates a correlation between a first feature represented in the feature groups and a second feature represented in the feature groups and is indicative of how many tenant computing systems that use the second feature also use the first feature;

apply the correlation model to feature usage data acquired from a tenant computing system under analysis to identify a correlated feature that is correlated to a feature used by the tenant computing system under analysis; and generate a control signal to control an interface system based on the correlated feature.

2. The computing system of claim 1, wherein the one or more hosted services provide one or more applications to the plurality of different tenant computing systems, the first feature comprises a first application action in the one or more applications, the second feature comprises a second application action, different from the first application action, in the one or more applications, and the control signal is configured to control the interface system to generate an interactive actuator that represents the correlated feature and is actuatable by a user to navigate the user to a user interface configured to execute an application action corresponding to the correlated feature.

3. The computing system of claim 2, wherein the instructions cause the computing system to:

detect rule information corresponding to the tenant computing system under analysis, the rule information being indicative of whether an applicable rule is to be applied to adjust the correlated feature; and compare the detected rule information with a set of rules to identify the applicable rule.

4. The computing system of claim 3, wherein the instructions cause the computing system to:

apply the applicable rule to the correlated feature to adjust a portion of the correlated feature as indicated by the applicable rule.

5. The computing system of claim 1, wherein the instructions cause the computing system to:

segment the plurality of different tenant computing systems into a plurality of different segments based on a segmentation criterion;

generate a plurality of correlation models, each correlation model corresponding to different one of the plurality of different segments;

select one of the correlation model based on identifying a particular segment, of the plurality of different segments, that the tenant computing system under analysis falls into based on the segmentation criterion; and apply the selected correlation model to feature usage data acquired from the tenant computing system under analysis to identify the correlated feature.

6. The computing system of claim 5, wherein the instructions cause the computing system to:

acquire demographic information from the plurality of different tenant computing systems, and wherein the segmentation criterion comprises a demographic criterion that segments the plurality of different tenant computing systems based on the demographic information.

7. The computing system of claim 5, wherein the plurality of different segments comprises a plurality of different usage segments, and the instructions cause the computing system to:

acquire usage information indicative of a usage level of users of each of the plurality of different tenant computing systems; and segment the plurality of different tenant computing systems into the of different usage segments based on the usage information, each usage segment including tenant computing systems having commonality of feature usage.

8. The computing system of claim 7, wherein the segmentation criterion generates groups of tenant computing systems having corresponding usage patterns.

9. The computing system of claim 7, wherein the instructions cause the computing system to:

for each particular segment of the plurality of different segments, build a binary feature usage matrix that is based on the usage information and indicates whether the different tenant computing systems in the particular segment uses the features represented by the feature groups, build a feature similarity matrix from the feature usage, and perform machine learning to update the binary feature usage matrix and the feature similarity matrix based on additional action data.

10. The computing system of claim 5, wherein the plurality of different segments comprises a plurality of different size segments, and the instructions cause the computing system to:

segment the plurality of different tenant computing systems into the different size segments based on a number of users of each of the plurality of different tenant computing systems.

11. A computer implemented method, comprising:

acquiring action data from a plurality of different tenant computing systems, each particular tenant computing system, of the plurality of different tenant computing systems, including a plurality of users that use one or more hosted services comprising a set of features, and the action data from each particular tenant computing system indicating actions taken by the plurality of users of the particular tenant computing system in using the set of features of the one or more hosted services;

grouping the action data, acquired for each tenant computing system, into feature groups wherein
  each feature group represents a feature of the set of features, and
  each feature group, for each particular tenant computing system indicates that the particular tenant computing system uses the feature represented by the feature group;
receive feature usage data representing usage of the set of features by different ones of the plurality of different tenant computing systems;
training, based on the feature usage data, a correlation model having a set of correlation scores, wherein
  each particular correlation score, in the set of correlation scores, indicates a correlation between a first feature re resented in the feature groups and a second feature represented in the feature groups and is indicative of how many tenant computing systems that use the second feature also use the first feature;
applying the correlation model to feature usage data acquired front a tenant computing system under analysis to identify a correlated feature that is correlated to a feature used by the tenant computing system under analysis; and
generating a control signal to control an interface system based on the correlated feature.

12. The computer implemented method of claim 11, wherein
  the one or more hosted services provide one or more applications to the plurality of different tenant computing systems,
  the first feature comprises a first application action in the one or more applications,
  the second feature comprises a second application action, different from the first application action, in the one or more applications, and
  the control signal controls the interface system to generate an interactive actuator that represents the correlated feature and is actuatable by a user to navigate the user to a user interface configured to execute an application action corresponding to the correlated feature.

13. The computer implemented method of claim 12 and further comprising:
  detecting rule information corresponding to the tenant computing system under analysis, the rule information being indicative of whether an applicable rule is to be applied to adjust the correlated feature; and
  comparing the detected rule information with a set of rules to identify the applicable rule.

14. The computer implemented method of claim 11 and further comprising:
  segmenting the plurality of different tenant computing systems into a plurality of different segments based on a segmentation criterion;
  generating a plurality of correlation models, each correlation model corresponding to a different one of plurality of different segments;
  selecting one of the correlation models based on identifying a particular segment, of the plurality of different segments, that the tenant computing system under analysis falls into based on the segmentation criterion; and
  applying the selected correlation model to feature usage data acquired from the tenant computing system under analysis to identify the correlated feature.

15. The computer implemented method of claim 14 and further comprising:
  acquiring demographic information from the plurality of different tenant computing systems, wherein the segmentation criterion comprises a demographic criterion that segments the plurality of different tenant computing systems based on the demographic information.

16. The computer implemented method of claim 14, wherein the plurality of different segments comprises a plurality of different usage segments, and further comprising:
  acquiring usage information indicative of a usage level of users of each of the plurality of different tenant computing systems; and
  segmenting the plurality of different tenant computing systems into the plurality of different usage segments based on the usage information, each usage segment including tenant computing systems having commonality of feature usage.

17. The computer implemented method of claim 16 and further comprising:
  generating groups of tenant computing systems having corresponding usage patterns.

18. The computer implemented method of claim 16, and further comprising:
  for each particular segment of the plurality of different segments,
    building a binary feature usage matrix that is based on the usage information and indicates whether the different tenant computing systems in the particular segment uses the features represented by the feature groups,
    building a feature similarity matrix from the feature usage, and
    performing machine learning to update the binary feature usage matrix and the feature similarity matrix based on additional action data.

19. The computer implemented method of claim 14, wherein the plurality of different segments comprises a plurality of different size segments, and further comprising:
  segmenting the plurality of different tenant computing systems into the different size segments based on a number of users of each of the plurality of different tenant computing systems.

20. A computing system, comprising:
at least one processor, and
memory storing instructions executable by the at least one processor, wherein the instructions, when executed, cause the computing system to:
  acquire action data from a plurality of different tenant computing systems, the action data from each tenant computing system indicating actions taken by users of the tenant computing system in using one or more hosted services;
  group the action data, acquired for each tenant computing system, into feature groups based on feature enabling functionality in the one or more hosted services that enables the actions indicated by the action data, wherein
    each feature group represents a feature, and
    each feature group for each particular tenant computing system indicates that the particular tenant computing system uses the feature represented by the feature group;
  group the plurality of different tenant computing systems into a plurality of different tenant groups based on segmentation criteria, each of the tenant groups comprising a set of tenant computing systems from the plurality of different tenant computing systems;

compare feature usage by different ones of the plurality of different tenant computing systems;

based on the feature usage, train a plurality of different correlation models, each correlation model corresponding to a particular tenant group, of the plurality of different tenant groups, and having a correlation score that is generated for each feature relative to each other feature represented in the feature groups, the correlation score for a first feature relative to a second feature being indicative of an extent to which tenant computing systems, in a same tenant group, that use the second feature also use the first feature;

select one of the correlation models for a tenant computing system under analysis based on a tenant group that corresponds to the tenant computing system under analysis;

apply the selected correlation model to usage data acquired from the tenant computing system under analysis to identify correlated features that are correlated to a feature used by the tenant computing system under analysis; and generate a control signal to control an interface system based on the correlated features.

\* \* \* \* \*